US011274918B2

(12) United States Patent
Schwarz et al.

(10) Patent No.: US 11,274,918 B2
(45) Date of Patent: Mar. 15, 2022

(54) PORTABLE TOE ANGLE MEASUREMENT APPARATUS AND METHOD

(71) Applicants: Daniel Schwarz, Wyoming, MI (US); Henry Schwarz, Grand Rapids, MI (US)

(72) Inventors: Daniel Schwarz, Wyoming, MI (US); Henry Schwarz, Grand Rapids, MI (US)

( * ) Notice: Subject to any disclaimer, the term of this patent is extended or adjusted under 35 U.S.C. 154(b) by 605 days.

(21) Appl. No.: 16/147,805

(22) Filed: Sep. 30, 2018

(65) Prior Publication Data

US 2019/0107390 A1 Apr. 11, 2019

Related U.S. Application Data

(60) Provisional application No. 62/568,516, filed on Oct. 5, 2017.

(51) Int. Cl.
*G01B 11/27* (2006.01)
*G01B 11/275* (2006.01)

(52) U.S. Cl.
CPC .......... *G01B 11/27* (2013.01); *G01B 11/2755* (2013.01); *G01B 2210/16* (2013.01); *G01B 2210/303* (2013.01)

(58) Field of Classification Search
CPC ............... G01B 11/27; G01B 11/2755; G01B 2210/303; G01B 2210/16
USPC ...................................... 356/152.3
See application file for complete search history.

(56) References Cited

U.S. PATENT DOCUMENTS

| 2,532,593 A | 12/1950 | Bender et al. |
| 3,181,248 A | 5/1965 | Manlove |
| 3,691,642 A | 9/1972 | Nolte et al. |
| 4,347,668 A | 9/1982 | Johnston |
| 4,500,201 A | 2/1985 | Lill |
| 4,942,667 A | 7/1990 | Fournier |
| 5,056,231 A | 10/1991 | Alusick et al. |
| 5,157,838 A | 10/1992 | Sims |
| 5,313,710 A | 5/1994 | Wakamori et al. |
| 5,367,778 A | 11/1994 | O'Hara |
| 5,675,408 A | 10/1997 | Samuelsson et al. |
| 5,852,241 A | 12/1998 | Fagerdahl et al. |

(Continued)

FOREIGN PATENT DOCUMENTS

WO   WO-9219932 A1 * 11/1992 ......... G01B 11/2755

OTHER PUBLICATIONS

"Toe (automotive)", Wikipedia Website, Web page <https://en.wikipedia.org/wiki/Toe_(automotive)>, 2 pages, dated at east as early as Sep. 14, 2021, retrieved from Wikipedia website on Sep. 14, 2021.

*Primary Examiner* — Daniel L Murphy
(74) *Attorney, Agent, or Firm* — The Law Office of Patrick F. O'Reilly III, LLC

(57) ABSTRACT

A portable laser emitter, laser target, and method for measuring the toe angle of a commercial truck steer axle are disclosed. The laser emitter is mounted to the wheel of a truck steer axle while the laser target is placed in front of the truck. Measurements are taken of the laser dot position on the target with the emitter mounted at either end of the steer axle. The process is then repeated with the target positioned behind the truck. The measurements taken from either end of the steer axle with both front and rear target positions are compared to determine the toe angle of the steer axle.

4 Claims, 3 Drawing Sheets

(56) References Cited

U.S. PATENT DOCUMENTS

| | | | |
|---|---|---|---|
| 6,082,011 | A | 7/2000 | Philips, III |
| 6,282,799 | B1 | 9/2001 | Warkotsch |
| 6,522,400 | B1 | 2/2003 | Horn |
| 6,718,646 | B2 | 4/2004 | Corghi |
| 6,799,376 | B1 | 10/2004 | Voeller et al. |
| 7,661,198 | B2 | 2/2010 | Hara |
| 7,913,404 | B1 | 3/2011 | Smith |
| 7,941,935 | B2 | 5/2011 | Khan |
| 8,401,236 | B2 | 3/2013 | Kassouf et al. |
| 10,113,866 | B1 | 10/2018 | Schwarz et al. |
| 2005/0115088 | A1 | 6/2005 | Paulsen |
| 2013/0239420 | A1 | 9/2013 | Kroll |
| 2015/0048225 | A1 | 2/2015 | Liu |
| 2017/0158241 | A1 | 6/2017 | Prusinowski |

* cited by examiner

PORTABLE TOE ANGLE MEASUREMENT APPARATUS AND METHOD

CROSS-REFERENCE TO RELATED PRIOR APPLICATIONS

This application claims the filing date of provisional patent application Ser. No. 62/568,516 filed Oct. 5, 2017 by the present inventors. This application expands the concepts of non-provisional patent application Ser. No. 15/296,260 filed Oct. 18, 2016 by the present inventors to include toe angle alignment for steer axles.

BACKGROUND

The following table indicates prior art that appears to be relevant to the invention disclosed:

| U.S. Patents | | | |
|---|---|---|---|
| Pat. No. | Kind Code | Issue Date | Patentee |
| 8,401,236 | B2 | Mar. 19, 2013 | Kassouf et al. |
| 7,913,404 | B1 | Mar. 29, 2011 | Smith |
| 7,661,198 | B2 | Feb. 16, 2010 | Hara |
| 6,799,376 | B1 | Oct. 5, 2004 | Voeller et al. |
| 6,522,400 | B1 | Feb. 18, 2003 | Horn |
| 6,082,011 | | Jul. 4, 2000 | Philips, III |
| 5,675,408 | | Oct. 7, 1997 | Samuelsson et al |
| 5,367,778 | | Nov. 29, 1994 | O'Hara |
| 5,313,710 | | May 24, 1994 | Wakamori et al. |
| 5,157,838 | | Oct. 27, 1992 | Sims |
| 4,500,201 | | Feb. 19, 1985 | Lill |
| 3,181,248 | | May 4, 1965 | Manlove |
| 2,532,593 | | Dec. 5, 1950 | Bender et al. |

The commercial trucking industry's profit margin is heavily dependent on the cost of fuel and tires. These two consumables can both be conserved by reducing rolling resistance of the truck and trailer wheels. The simplest way to reduce rolling resistance is to maintain alignment of the vehicle's wheels which are prone to becoming misaligned under heavy loading.

Many commercial trucking businesses are not equipped with alignment tools necessary to maintain their fleet of trucks and trailers. Instead they routinely send their vehicles to alignment shops that use complex and expensive alignment systems such as described in U.S. Pat. No. 8,401,236. The high cost associated with this type of alignment system, coupled with rising fuel and tire prices, has led to the development of simple, inexpensive, and portable alignment systems such as described in U.S. Pat. No. 7,913,404. However this type of alignment system is more prone to measurement error due to its dependence on less reliable measurement references and constraints.

The commercial trucking industry needs a toe angle alignment system that is simple, inexpensive, portable, and less susceptible to measurement error than alignment systems currently offered by the market. An alignment system that achieves these objectives will be disclosed.

SUMMARY OF THE INVENTION

The present invention is an axle alignment system for measuring steer axle toe angles. The system includes a laser emitter, a laser target, and mounting components. The laser emitter is mounted to a steer wheel such that the laser beam is projected perpendicular to the axis of the wheel toward the target. A laser target is placed in front of the vehicle with a measurement scale facing the laser emitter. A measurement is taken from the scale when the emitter is mounted on each end of the steer axle in question. The target is moved to the rear of the vehicle and the measurement process is repeated with the emitter facing rearward. The measurements taken from either end of the axle are input to a phone or desktop computer application along with the distance between the two target positions. The application uses the input measurements to calculate total toe angle between the steer wheels.

The primary advantage of this axle alignment system is that it only requires one laser emitter. Since the same laser emitter is used to take measurements on both ends of the axle in question, any error in parallelism within the laser emitter assembly is negated when the laser is flipped 180 degrees to measure the opposite end of the axle. The laser emitter error would be repeated in opposite directions to create a net zero error. Therefore, laser emitter calibration discrepancies produce little impact on the measurement accuracy. Additionally, a system that utilizes a single laser emitter is less costly than a system which relies on multiple lasers.

Another advantage of this toe measurement system is the large distance between the laser emitter and the laser target. The further the laser beam travels, the more sensitive the measurement scale is to angular deviation of the steer wheels. At a laser beam length of 285", the toe angle precision is ±0.0125 degrees when the target scale demarcations are at 1/16" increments. This allows the user to align the axle with greater precision than if the beam was projected a shorter distance.

Yet another advantage of this axle alignment system is that the laser emitter and targets are constrained using reliable constraints. Precisely machined surfaces on the laser emitter and targets are mated with precisely machined surfaces on the truck reference features. All degrees of freedom between the alignment apparatus and vehicle are completely constrained with tight clearances between mating features. These reliable references and constraints produce measurements that are both accurate and repeatable.

DETAILED DESCRIPTION OF THE PREFERRED EMBODIMENTS

Figure 1:
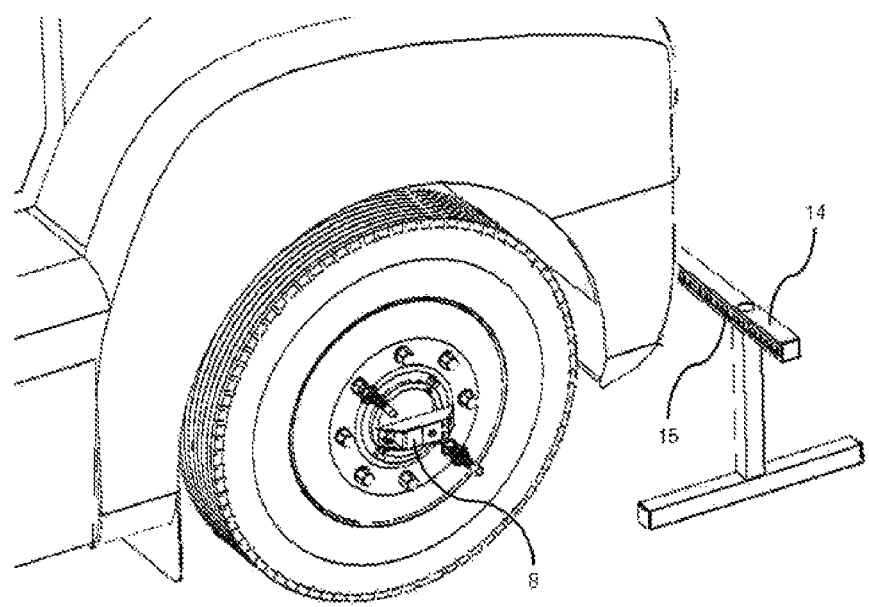
FIG. 1 is an isometric perspective of the laser emitter and target in use.
Figure 2:
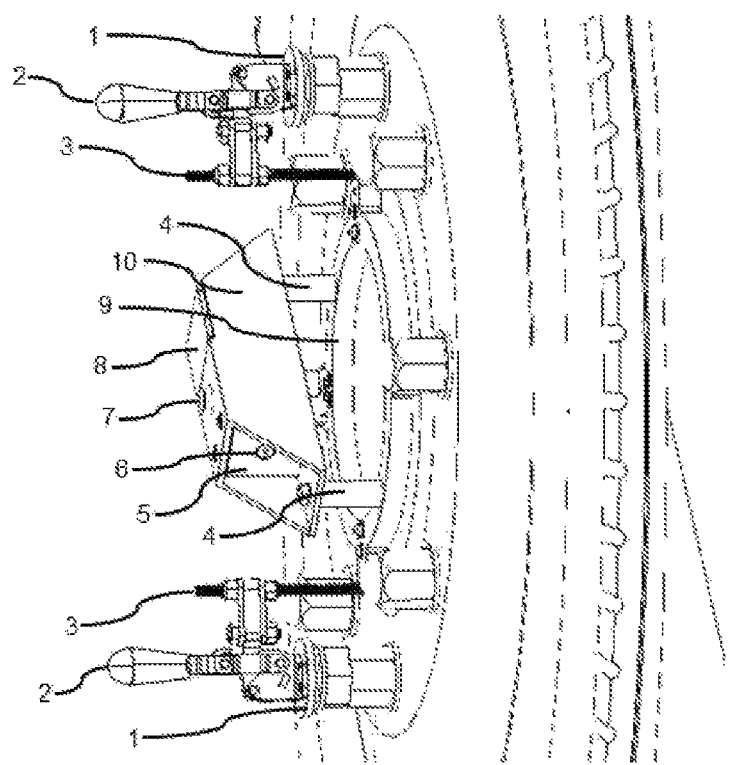
FIG. 2 is a top down perspective of the laser emitter assembly mounted to a wheel in need of toe measurement.

The preferred embodiment of the laser emitter assembly is illustrated by FIG. 1 and FIG. 2. Clamp nut 1 is threaded onto a lug of the steer wheel of interest. Toggle clamp 2 is constrained to clamp nut 1 with a weld between the flange ring of clamp nut 1 and the mounting base of toggle clamp 2. The flange ring swivels freely, allowing toggle clamp 2 to be rotated relative to clamp nut 1 which is affixed to the wheel lug. Clamp bolt 3 is fastened to the end of the toggle clamp 2 armatures. Clamp bolt 3 presses the wheel bore reference features of steer wheel laser base 9 into the center bore of the steer wheel. Spacers 4 are constrained perpendicular to steer wheel laser base 9 with threaded fasteners. Laser tube 10 is constrained on top of the spacers 4 with threaded fasteners. Laser emitter housing 5 is constrained to the laser tube 10 with threaded fasteners. Laser emitter 6 is press fit into a precision bore in the front of the laser emitter housing 5. The laser emitter 6 is powered by a battery pack constrained to laser tube 10 with threaded fasteners. The battery pack is hidden beneath battery cover 8 which is also constrained to laser tube 10 with threaded fasteners. The laser emitter 6 projects a laser beam when the battery power switch 7 is activated. The laser beam is emitted parallel to the surface plane of the wheel rim due to the constraints between the laser emitter 6, laser emitter housing 5, laser reference tube 10, spacers 4, steer wheel laser base 9, and the rim of the wheel.

Figure 3:
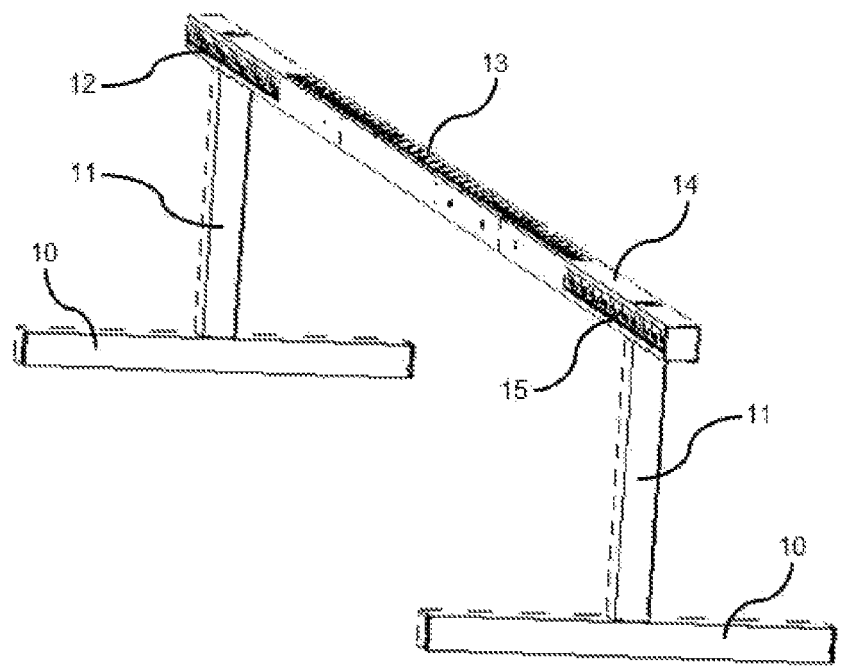
FIG. 3 is a side perspective of the laser target assembly.
Figure 4:
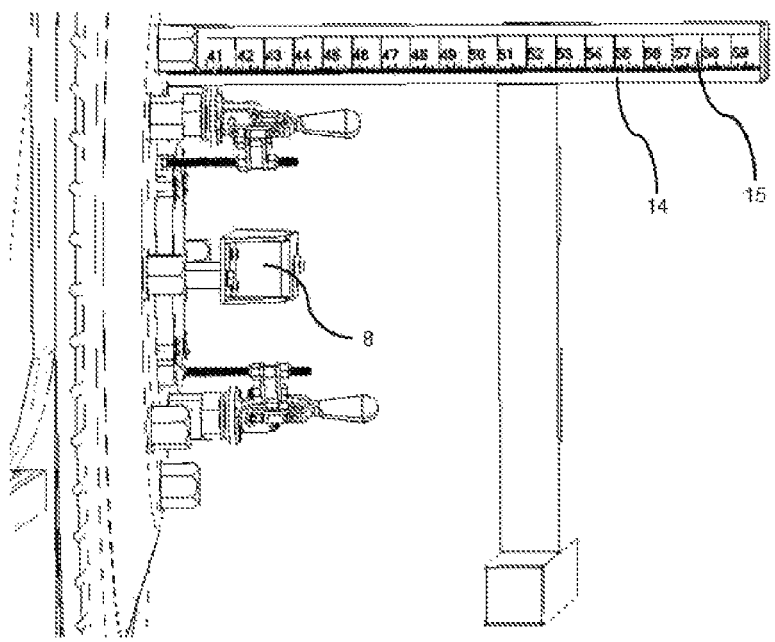
FIG. 4 is a rear perspective of a truck with a laser emitter assembly mounted to a wheel in need of toe measurement.
Figure 5:
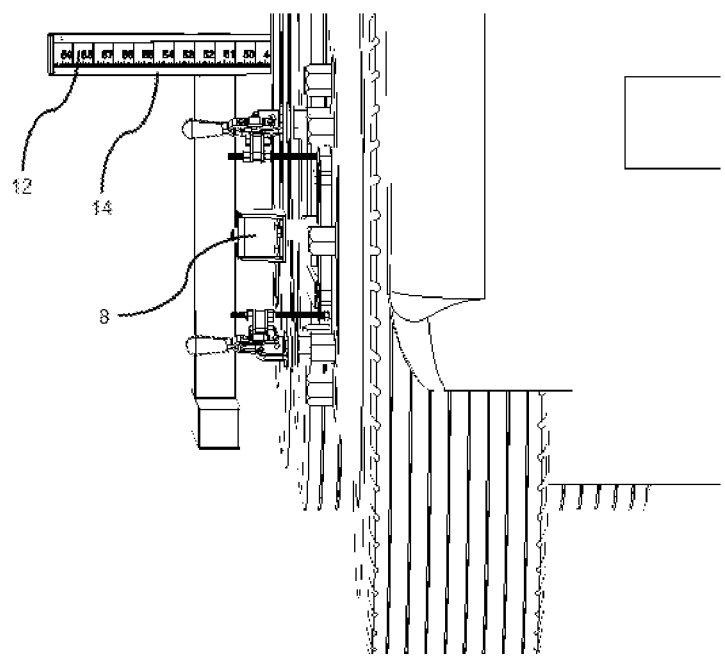
FIG. 5 is a front perspective of the truck with a laser emitter assembly mounted to a wheel in need of toe measurement.

The preferred embodiment of the laser target assembly is illustrated by FIG. 3. Horizontal leg tubes 10 sit on the ground with vertical leg tubes 11 fastened perpendicular. A target tube 14 with measurement scales 12, 13, and 15 is fastened to the vertical leg tubes 11.

To align a steer axle toe angle (1) constrain the laser emitter assembly to one of the steer wheels with the laser emitter 6 facing the front of the vehicle and the laser beam roughly parallel with the ground, (2) place the target assembly in front of the vehicle at a predetermined distance from the center of the steer wheel, (3) orient the target parallel to the steer axle, roughly centered with the center line of the vehicle with the measurement scales facing the laser emitter assembly, (4) press button 7 to emit a laser dot on the front of target tube 14, (5) measure the laser dot position on measurement scale 12 or measurement scale 15, (6) repeat steps 1 through 4 on the opposite steer wheel, (7) constrain the laser emitter assembly to one of the steer wheels with the laser emitter 6 facing the rear of the vehicle and the laser beam roughly parallel with the ground, (8) place the target assembly behind the vehicle at a predetermined distance from the center of the steer wheel, (9) orient the target parallel to the steer axle, roughly centered with the center line of the vehicle with the measurement scales facing the laser emitter assembly, (10) press button 7 to emit a laser dot on the front of target tube 14, (11) measure the laser dot position on measurement scale 12 or measurement scale 15, (12) Repeat steps 7 through 10 on the opposite steer wheel, (11) A mathematical algorithm is used to determine the total toe angle between the steer wheels using the four measurements taken and the predetermined target distances. (12) If necessary, toe adjustments are made and steps 1-11 are repeated to verify that the desired total toe angle has been achieved.

The preceding disclosures of preferred embodiments are in no way intended to limit the listed claims. The devices described in these claims may be manufactured using various materials, may take on forms other than the illustrated embodiments, and may be used for aligning axles of various types.

We claim:

1. An apparatus for measuring a toe angle of a vehicle, comprising:
    a laser emitter that emits a laser beam substantially perpendicular to an axis of a wheel when said laser emitter is held against a center disc of the wheel, and
    a free standing laser target with a plurality of elongate measurement scales mounted to said laser target substantially parallel with the ground and projecting away from both sides of a substantially centered mark on said laser target whereby said laser target is approximately centered with said vehicle.

2. The apparatus of claim 1 wherein said laser emitter is detachably mounted by a plurality of adjustable swiveling toggle clamps detachably mounted to lugs of the wheel.

3. The apparatus of claim 1 wherein said laser emitter has cylindrical features that mate with an inner bore of the wheel.

4. A method of measuring a total toe angle between wheels of a vehicle axle, the method comprising the steps of:
    positioning a floor standing laser target in front of a vehicle such that a substantially centered marking on said floor standing laser target is approximately aligned with a center of said vehicle and measurement scales attached to said floor standing laser target are oriented approximately parallel to an axle,
    constraining a laser emitter to a first side wheel attached to said axle such that a laser beam is projected toward a front of said vehicle substantially perpendicular to an axis of said first side wheel,
    measuring an approximate distance between said laser emitter and said floor standing laser target disposed in front of said vehicle,
    measuring a first side front laser dot position projected by said laser emitter on said floor standing laser target,
    constraining said laser emitter to a second side wheel such that a laser beam is projected toward the front of said vehicle substantially perpendicular to an axis of said second side wheel,
    measuring a second side laser front dot position projected by said laser emitter on said floor standing laser target,
    positioning said floor standing laser target behind said vehicle such that the substantially centered marking on said floor standing laser target is approximately aligned with the center of said vehicle and said measurement scales attached to said floor standing laser target are oriented approximately parallel to said axle,
    constraining said laser emitter to said first side wheel such that a laser beam is projected toward a rear of said vehicle substantially perpendicular to the axis of said first side wheel,
    measuring an approximate distance between said laser emitter and said floor standing laser target disposed behind said vehicle,
    measuring a first side rear laser dot position projected by said laser emitter on said floor standing laser target,
    constraining said laser emitter to said second side wheel such that a laser beam is projected toward the rear of said vehicle substantially perpendicular to the axis of said second side wheel,
    measuring a second side rear laser dot position projected by said laser emitter on said floor standing laser target,
    and using said distance measurements and said laser dot positions to calculate a total toe angle between said first side wheel and said second side wheel of said axle.

* * * * *